T. L. TALIAFERRO.
CAN TRANSFERRING MECHANISM.
APPLICATION FILED NOV. 30, 1908.
1,092,609.
Patented Apr. 7, 1914.
3 SHEETS—SHEET 1.
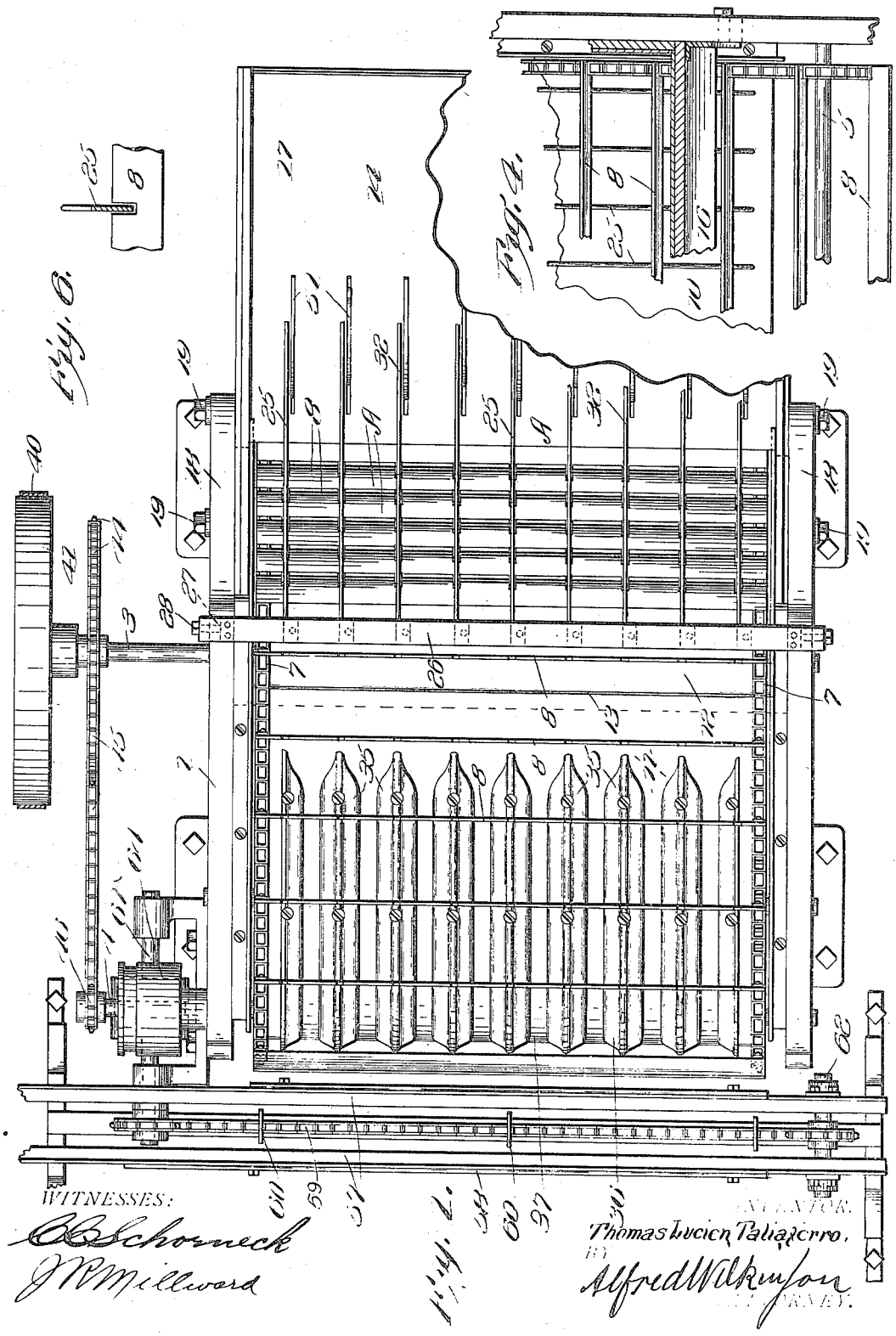
WITNESSES:
OB Schorneck
JR Millward
INVENTOR
Thomas Lucien Taliaferro,
BY Alfred Wilkinson
ATTORNEY

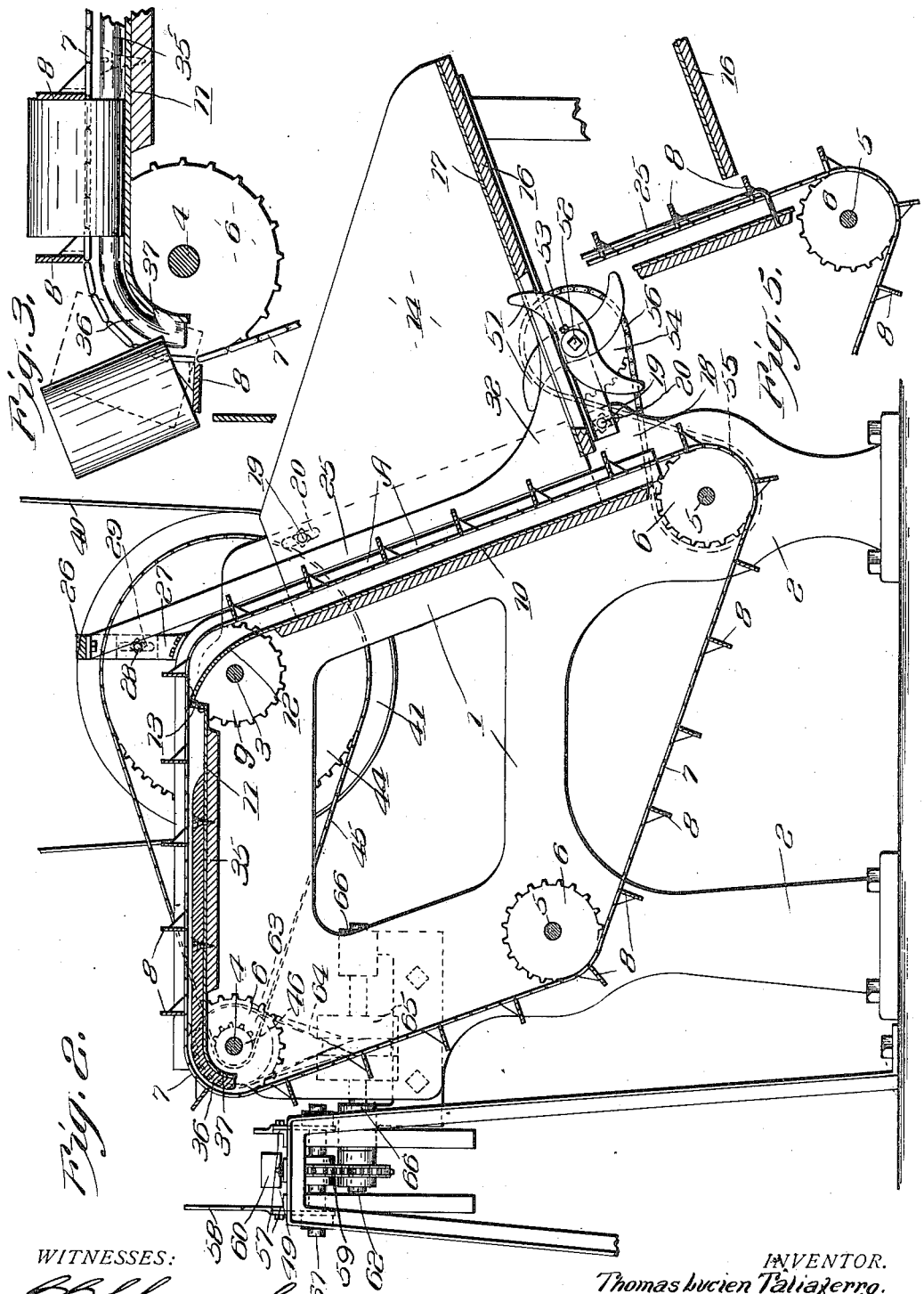

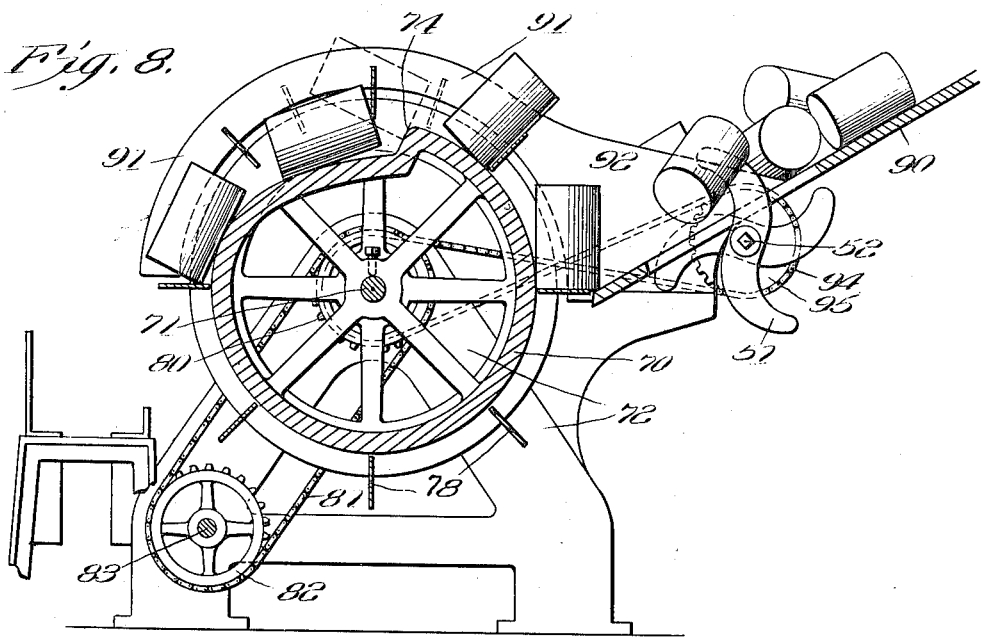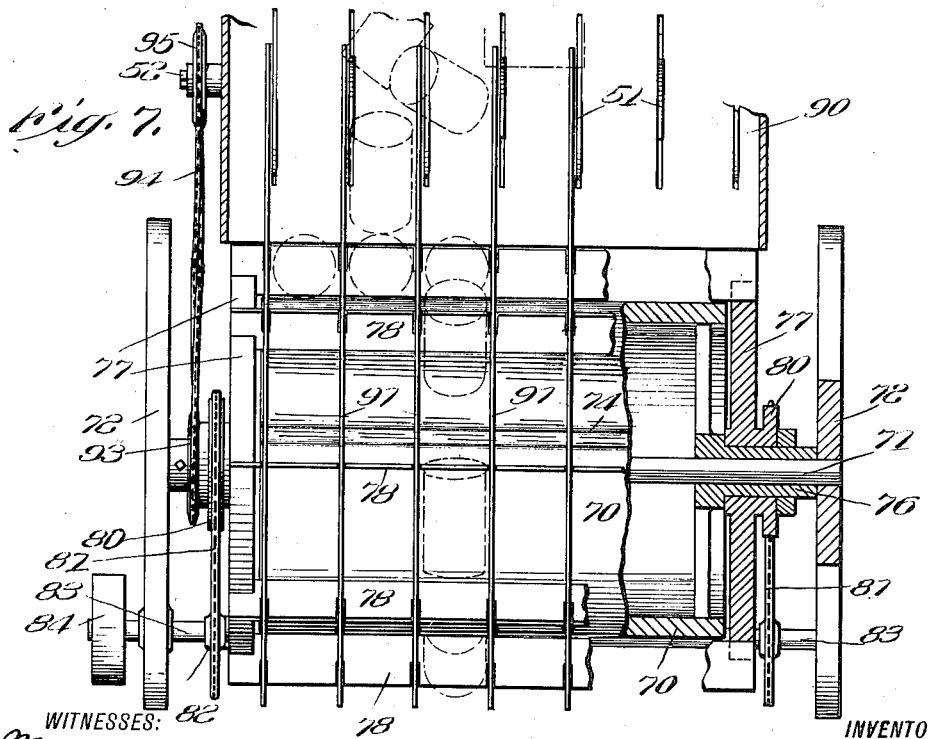

UNITED STATES PATENT OFFICE.

THOMAS LUCIEN TALIAFERRO, OF BALTIMORE, MARYLAND, ASSIGNOR TO CONTINENTAL CAN COMPANY, OF SYRACUSE, NEW YORK, A CORPORATION OF NEW JERSEY.

CAN-TRANSFERRING MECHANISM.

1,092,609.  Specification of Letters Patent.  Patented Apr. 7, 1914.

Application filed November 30, 1908. Serial No. 465,141.

*To all whom it may concern:*

Be it known that I, THOMAS LUCIEN TALIAFERRO, citizen of the United States, residing at Baltimore city and State of Maryland, have invented new and useful Improvements in Can-Transferring Mechanisms, of which the following is a specification.

The invention relates to devices for delivering cans to a conveyer, and more especially to devices of the character which take cans which have been dumped promiscuously into a receptacle and deliver the same in a predetermined order to a conveyer or run-way.

An object of the invention is to provide means for receiving cans and delivering the same to an endless conveyer, which means includes devices for changing the position of certain of the cans during the travel of the same, whereby said cans are delivered to the conveyer with the longitudinal axes of the can similarly positioned.

A further object of the invention is to provide means for lifting cans from a receptacle or hopper in which they have been promiscuously placed, together with coöperating devices for placing the cans with their longitudinal axes extending in the same general direction, and delivering the same to an endless conveyer or run-way.

These and other objects will be obvious, and will hereinafter be more fully described.

In the drawings which show by way of illustration one embodiment of the invention, Figure 1 is a top plan view of a machine embodying the improvements; Fig. 2 is a vertical longitudinal section thereof; Fig. 3 is a detail on an enlarged scale, showing the manner of delivering the cans into the conveyer; Fig. 4 is a detail view showing a portion of the machine in front elevation, containing a modified form of partition; Fig. 5 is a similar view in vertical section; Fig. 6 is a detail, showing the relation of the supporting shelves and the separating partition; Fig. 7 is a plan view with portions broken away, showing a modified form of a machine embodying the invention; Fig. 8 is a vertical cross section of the same.

In carrying out the invention, the apparatus for receiving the cans and delivering the same to an endless conveyer in a predetermined order, consists generally of a receptacle or hopper into which the cans may be promiscuously placed. The cans are removed from the receptacle by a carrier, which as shown in Figs. 1 to 6 inclusive, comprises shelves carried by endless chains, while in Figs. 7 and 8 the endless carrier consists of shelves revolving about a fixed center. These supporting shelves lift certain of the cans from the hopper or receptacle, and deliver the same to the endless conveyer. Partitions are provided which extend into the hopper so that only such cans as are placed with their axes lying in a vertical plane, will be picked up and carried along by the carrier. Means is also provided which as herein shown, consists of an up-setting recess which operates to reposition the cans which stand on end on the supporting member so that said cans will have their longitudinal axes extending in the general direction of travel of the carrier, and thereby all the cans delivered to the conveyer will have their longitudinal axes positioned in the same general direction.

Describing the machine more in detail, the preferred form of the invention shown in Figs. 1 to 6, consists of a main frame 1 which is mounted on suitable supporting legs 2. Journaled in the frame is a main driving shaft 3 and a rear driving shaft 4. Idler shafts 5, 5, are provided on which are mounted sprockets 6 and idler sprockets 6 are also mounted to turn freely on the shaft 4. The sprockets 9 fixed on the shaft 3, the idler sprockets 6 freely movable on the shaft 4, and the idler sprockets 6, 6, on the shaft 5, 5, receive the sprocket chains 7. The two chains 7, 7, are located adjacent the sides of the frame, as clearly shown in Fig. 1. These chains are so positioned as to pass in front of an inclined support 10, mounted at the front of the frame, and over a similar horizontal support 11, at the top of the frame. The sprocket chains 7, 7, carry a plurality of shelves 8, which are preferably spaced at a distance slightly greater than the height of the cans which are to be delivered to the conveyer, so that a can may stand on end on the shelf and rest against the support 10, along which it may be slid by the movement of the carrier. The inclined support 10 and the horizontal support 11, are connected by a curved supporting part 12, which is formed with a substantially vertical shoulder 13. The purpose of this shoulder 13 is to upset any of the cans which may be placed on the shelves with their longitudinal axes at right angles to the travel of the carrier. It will readily be seen that when such cans are moved along the support and pass over the shoulder 13, that the weight of the can will upset or tilt the can, so that it will fall over on to its side and thus be positioned with its longitudinal axis extending in the general direction of travel of the conveyer. The support 10 is slightly inclined so as to assist in maintaining the cans on the supporting shelves. As a means for supplying the carrier with cans, I have provided a hopper or receptacle 14 into which the can bodies may be promiscuously dumped. This hopper may be formed of thin metal and for strength may be provided with a heavy base plate 16, which reinforces the metal bottom 17 of the hopper. The hopper is secured to the side plates 18 of the frame, and is preferably made vertically adjustable thereon by means of bolts 19 and slots 20. The space between the shelves and the sprocket chains 7, 7, is divided into vertical pockets A, A, by vertical partitions 25 which may be supported in any desired way on the cross bar. This cross bar 26 is vertically adjustable on the side post 27, by means of bolts 28 and slots 29, to correspond to the position of the hopper. The shelves 8 may be slotted to fit over the partitions 25. These partitions at their lower ends are formed with outwardly curved portions 32, which extend into the hopper. The purpose of these partitions is to give to the cans which are taken up by the conveyer the first positioning thereof. These partitions are spaced a distance slightly greater than the diameter of the can body, and therefore, the only cans which may slide down the inclined bottom 17 of the hopper or receptacle against the inclined support 10, will be those cans in which the longitudinal axes thereof lie substantially in a vertical plane. It is true that certain of these cans when picked up by the carrier will be supported on end on the carrier, and others will be supported on their sides on the carrier, but no can can be taken by the carrier whose longitudinal axis extends transversely of the direction of movement of the carrier.

In Figs. 4 and 5, I have shown a slight modification of the form of the separating partitions above referred to. These partitions are in the shape of guide rods without the curved bottom portions, and these rods are arranged to fit in the slots in the rear edges of the shelves. The lower edge of the lower supporting plate or base 17 of the hopper terminates short of the inclined support 10, so that the carrier may move along in front of the support 10, and in reality passes up through the hopper or receptacle, and lifts the cans from the receptacle. There is a great advantage in this arrangement of parts in that the lifting of the cans from the receptacle continually loosens the cans and prevents the interlocking or clogging of the cans which would occur if the conveyer moved in the opposite direction and carried the cans downward through openings in the bottom of the receptacle. The cans picked up by the carrier are moved along the front inclined support 10, between the separating walls 25 and over on to the horizontal support 11. The horizontal support 11 is formed with a series of guides 35 which are arranged in alinement with the partitions 25. The rear ends of these guides 36 (see Fig. 3) are preferably curved downwardly to correspond with the downwardly curved edge 37 of the horizontal support 11. As the cans move along the horizontal support 11, they are brought to the curved portion 37 thereof, and as shown in Fig. 3 the weight of the can will throw the same forward against the shelf 8 in front of the can, and from the shelf 8 will fall over into the run-way or endless conveyer and be properly positioned thereon.

The endless chains 7 as shown, are driven by a belt 40 from any suitable source of power, through a pulley 41 on the main shaft 3. This shaft is also provided with a large gear 44 which is connected by a sprocket chain 45, to a small pinion 46 on the rear driving shaft 4. To furthermore insure the entrance of the cans into the pockets A, A, I have provided agitating fingers 51, which are arranged immediately adjacent to the partitions at their lower ends, so that when said fingers are rotated they will engage and agitate the cans in the hopper or receptacle and particularly such as may span the space between partitions, and lodge on two adjacent curved portions of the partitions. These fingers are preferably alternately arranged as shown, so that the cans are engaged first at one end and then the other by adjacent fingers, and thereby the cans are tilted into the pockets, as more clearly shown in Fig. 8. These fingers may be laterally adjusted on the supporting shaft 52, so as to be adapted for cans of different sizes, and are held securely in position by set screws 53. This finger shaft 52 is preferably square in cross section, and is journaled in the side faces of the frame. The shaft 52 is provided on its outer end with a sprocket wheel 54 which is connected with a sprocket wheel 55 on the shaft 5, by a chain 56. The run-ways or endless conveyers for the cans indicated at 49, are carried by the usual supporting legs arranged at various points along the conveyers. The conveyer consists of supports formed of angle-irons 57, which are suitably spaced so as to receive between them the cans with their axes extending transversely of the conveyer. At a point opposite the delivering device, the conveyer is provided with a guard 58 to insure the dropping of the cans into the runway. As a means for moving the cans along the runway, a sprocket chain 59, carrying pushers 60, is mounted on sprocket wheels carried by suitable short shafts 61 and 62. The shaft 61 may be operated by means of the pulley 63 indicated in Fig. 2 in dotted lines, from which the belt 64 extends to a pulley 65 on the short shaft 61. The short shaft 61 is mounted in suitable bearings 66 in the main frame of the machine. The sprocket chain or conveyer is preferably driven at such speed relative to the speed of the endless chains 7, as to keep the runway free to receive the cans delivered thereto.

In the modified form of machine shown in Figs. 7 and 8, the parts are all substantially the same as above described, except that the supporting member for the cans along which the carrier moves the cans, is in the form of a cylinder or drum instead of in the form of a table having the inclined front and horizontal top above described. This cylinder or drum 70 is secured to the shaft 71, mounted in the side standards or legs 72 of the main frame. The drum is provided with a shoulder 74 which is identical in function and operation with the shoulder 13 shown in Fig. 2. The drum is formed with hubs 76 which constitute journaled bearings for the revolving disk 77 carrying shelves 78 which are the same in function and general arrangement as the shelves 8 heretofore described. To move the shelves and cans supported thereon, the disks are provided with sprocket wheels 80 connected by chains 81 to sprocket wheels 82 on the common drive shaft 83 which is operated from any suitable source of power through the pulley 84. The hopper in this form of my machine, differs only slightly from that shown, and described above. The partitions 91 of the machine as shown in Figs. 7 and 8, are also the same in function as the partitions 25 and are provided with similar curved portions 92. These partitions however, extend over the top of the drum and take the place of the guides 35 shown in Fig. 1. It is of course, obvious that the partitions 25 shown in Figs. 1 to 6 inclusive, might be made integral with the guides 35 in a manner similar to these partitions 91. The agitating fingers 51 in this form of the machine, also coöperate with the partitions in presenting the cans to the carrier or supporting shelves. The finger shaft 52 as herein shown, is rotated from the shaft 71 which is provided with a sprocket wheel 93 connected by a sprocket chain 94 to the sprocket wheel 95 on the finger shaft.

The operation of my device will be obvious from the above description. The cans are dumped promiscuously into the hopper or receptacle 14. The partitions will direct said cans to the carrier so that only those cans having their axes arranged substantially in a vertical plane will be picked up by the carrier and moved along the support on which the cans rest. The agitating device in the hopper or receptacle will assist in preventing the cans in a mass in the hopper from locking, and in presenting said cans so that they may be engaged by the carrier. The passing of the carrier up through the receptacle or hopper will also continually loosen up the cans and prevent clogging of the same. Those cans received by the carrier having their longitudinal axes at right angles to the travel of the carrier, are upset or re-positioned during the travel of the cans through the aid of the shoulder in the supporting member, and as the cans leave the delivering device, the longitudinal axes of the same will all be extending in the same general direction, so that they may be properly dropped into the runway or endless conveyer.

It is obvious that minor changes in the details of construction and arrangement of parts may be made without departing from the spirit of the invention as set forth in the appended claims.

Having thus particularly described my invention, what I claim as new and desire to secure by Letters Patent is:—

1. The combination of a receptacle in which cans may be promiscuously placed, a runway for receiving the cans, and means for delivering the cans to the runway including a carrier for removing the cans from said receptacle, means for positioning the cans in a predetermined relation to the carrier, and means operating upon the cans on the carrier between the receptacle and the runway for placing said cans with their longitudinal axes extending in the same general direction.

2. The combination of a receptacle in which cans may be promiscuously placed, a carrier having devices to engage and lift from the receptacle cans positioned in a certain relation to the carrier, and means operating upon the cans on the carrier during their travel with the carrier for placing said cans with their longitudinal axes extending in the same general direction.

3. The combination of a receptacle in which cans may be promiscuously placed, a runway for receiving the cans, means for delivering the cans from the receptacle to the runway in a predetermined order, including a stationary support, means for lifting the cans from the receptacle and moving the same along said stationary support, said support including means located between the receptacle and the runway and operating upon the cans whereby all of the cans as they leave the stationary support will have their longitudinal axes extending in the same general direction.

4. The combination of a receptacle in which cans may be promiscuously placed, a run-way, means for delivering cans from the receptacle to the run-way in a predetermined order, including a stationary support forming a part of the receptacle, partitions coöperating with the support for dividing the same into pockets adapted to receive cans having their longitudinal axes arranged in vertical planes, a carrier for lifting the cans from the receptacle and sliding the same along said support in said pockets, and means operating upon the cans during their travel with the carrier, whereby the cans as they leave the support, will have their longitudinal axes extending substantially in the same direction.

5. A can transferring mechanism including in combination a main frame, a support for the cans having an inclined front portion against which the cans are delivered, and an upsetting shoulder on its rearward portion, a series of shelves arranged transversely of the support and in vertical relation thereto, said shelves being suitably spaced to receive between them the cans lengthwise, means for moving the shelves rearwardly over the support, means to deliver the cans to the shelves against the support, and partitions suitably arranged to divide the spaces between the shelves into pockets.

6. A can transferring mechanism including in combination, a main frame, a support carried thereby and arranged to support the cans to ride thereon, said support having an inclined front portion, means to engage the cans and propel them rearwardly over the support, partitions suitably arranged with relation to said propelling means to form pockets for the cans, and a hopper arranged to deliver the cans against the inclined front portion of the support to the pockets thereon, said partitions having outwardly extending lower guide portions adjacent to the hopper adapted to position the cans correctly to enter the pockets.

7. A can transferring mechanism including in combination, a main frame, a support carried by said main frame on which the cans ride, said support having an inclined front portion and a rear portion, and provided intermediate said front and rear portions with a shoulder to upset the cans, an endless series of shelves suitably supported and arranged transversely of the support, and projecting outwardly therefrom, said shelves being spaced to receive between them the cans longitudinally arranged, means to move the shelves forwardly over the support and to return them rearwardly beneath the support, partitions suitably carried adjacent the front inclined portion of the support and arranged with relation to the shelves to form therewith pockets for the cans, the pockets so formed being each of sufficient size to accommodate a single can in longitudinal position, an inclined hopper arranged adjacent said inclined front body portion to deliver the cans against the partition to enter the pockets, said partitions being provided with outwardly extending lower guide portions adapted to upset the cans into the pockets, agitating fingers suitably journaled, said fingers being arranged adjacent to said guide portions and set on the quadrant to engage the cans alternately on either side of the pockets, and means to operate said fingers.

8. A can transferring mechanism including in combination a main frame, a support carried thereby to support the cans to ride thereon, said support having an inclined front portion and a rear portion, and provided intermediate said front and rear portions with a shoulder to upset the cans, means to engage the cans and advance them rearwardly over the support, and partitions suitably supported adjacent to said inclined portion of the support, and arranged with relation to the advancing means to form pockets therein for the cans.

9. A can transferring machine including in combination a main frame, a stationary support thereon, endless shelf supporting elements, journaled bearings for said elements, a series of transverse shelves supported on said elements, said shelves being spaced to receive between them the cans set on end, a hopper arranged in front of the machine and inclined upward adjacent to the shelves, means to move said elements and shelves from initial position adjacent to the hopper upwardly and then rearwardly, and finally to return the shelves to initial position, said support being arranged as a backing for the shelves to prevent the cans from dropping between them, and means arranged between the front and rear of the machine to insure the cans assuming a position with their sides raised against the support, as they pass over the top of the machine.

10. In a can transferring machine, the combination with a main frame, of a stationary support thereon, endless shelf supporting elements, journaled bearings for said elements, a series of transverse shelves supported on said elements, said shelves being spaced to receive between them the cans set on end, a hopper arranged at the front of the machine and inclined downwardly adjacent to the shelves, means to move said elements and shelves from initial position adjacent to the hopper upwardly, then rearwardly, and finally return the shelves to initial position, said support being arranged as a backing for the shelves to prevent the cans dropping between them, and a shoulder in said support at the top of the machine to upset those cans which may be on the shelves with their ends in contact with the support.

11. A can transferring machine including in combination, a main frame, a support arranged thereon, a series of parallel shelves arranged transversely of the support and spaced to receive between them the cans lengthwise, means to move the shelves rearwardly over the support, a cross bar arranged at the top of the machine near the front, means for vertically adjusting said bar, a series of thin metal partitions fixed on said bar and extending downwardly therefrom at the front of the machine, said partitions being arranged to divide the space between the shelves into pockets.

12. A can transferring mechanism including in combination a main frame, a support thereon, said support forming a rest for the moving cans, and a series of movable transverse shelves to receive the cans, means to support said shelves, and to move them carrying the cans from front to rear of the machine over the support, vertical partitions suitably arranged with relation to said shelves to form pockets for the cans, means to deliver the cans promiscuously to the pockets, agitating fingers suitably arranged adjacent to the pockets to turn the cans in position to enter the pockets, and means to operate the fingers.

13. A can transferring machine including in combination a main frame, a support arranged thereon, and forming a rest for the moving cans, said support having an upwardly and rearwardly inclined front and an upsetting shoulder for the cans adjacent the top thereof, a series of endless flexible elements suitably supported on journaled bearings, a series of transverse shelves arranged on said flexible elements, and means to move said elements and shelves upwardly along the front of the machine, and rearwardly over the top of the machine.

14. A can transferring mechanism including in combination, a main frame, a stationary support carried thereby having an inclined front portion on which the cans rest and slide, a hopper for directing the cans to said inclined support, the bottom of said hopper being spaced from said support, a carrier and means for moving said carrier upward through the hopper between the lower edge of the bottom and said support, for lifting the cans from the hopper and sliding the same along the support, and spaced partitions forming pockets for guiding the cans.

15. A can transferring mechanism including in combination, a main frame, a stationary support, a hopper or receptacle having an inclined bottom portion spaced from said support, a carrier adapted to move the cans along said support, said carrier passing between the support and said bottom portion of the hopper, vertical partitions for directing the cans to said carrier, means for agitating the cans in the hopper, said support having a recess therein forming a shoulder for upsetting the cans having their ends resting against the support, and a run-way into which the cans are delivered by said carrier.

In testimony whereof I have signed my name to this specification in the presence of two subscribing witnesses.

THOMAS LUCIEN TALIAFERRO.

Witnesses:
Jno. T. Ochs,
Wm. Fabiszak.